(12) United States Patent
Schaub et al.

(10) Patent No.: US 10,882,653 B2
(45) Date of Patent: Jan. 5, 2021

(54) PACKAGING MACHINE WITH A PROTECTIVE COVER, A TOKEN FASTENING CAPSULE ARRANGED THEREON AS WELL AS A METHOD

(71) Applicant: Multivac Sepp Haggenmüller SE & Co. KG, Wolfertschwenden (DE)

(72) Inventors: Hubert Schaub, Waltenhofen (DE); Manuel Wölfle, Lauben (DE); Nadine Reichart, Unterjoch/Bad Hindelang (DE); Alexander Wanner, Bad Grönenbach (DE)

(73) Assignee: MULTIVAC SEPP HAGGENMUELLER SE & CO. KG, Wolfertschwenden (DE)

( * ) Notice: Subject to any disclaimer, the term of this patent is extended or adjusted under 35 U.S.C. 154(b) by 136 days.

(21) Appl. No.: 16/188,113

(22) Filed: Nov. 12, 2018

(65) Prior Publication Data
US 2019/0144153 A1    May 16, 2019

(30) Foreign Application Priority Data
Nov. 13, 2017  (DE) .................. 10 2017 126 615

(51) Int. Cl.
*B65B 65/00*    (2006.01)
*F16P 3/08*    (2006.01)
(Continued)

(52) U.S. Cl.
CPC ............ *B65B 57/005* (2013.01); *B65B 59/04* (2013.01); *B65B 65/00* (2013.01); *F16P 1/02* (2013.01); *F16P 3/08* (2013.01)

(58) Field of Classification Search
CPC ......... B65B 9/04; B65B 57/005; B65B 59/04; B65B 65/00; F16P 1/02; F16P 3/08; H03K 2217/945; H03K 2217/95
(Continued)

(56) References Cited

U.S. PATENT DOCUMENTS 3,633,041 A * 1/1972 Koskela .................. D06F 37/42
307/119
4,105,903 A * 8/1978 Shaw et al. .............. F16P 3/08
210/146
(Continued)

FOREIGN PATENT DOCUMENTS

DE    102007020313 A1    11/2008
DE    102008053665 A1    5/2010
(Continued)

*Primary Examiner* — Stephen F. Gerrity
(74) *Attorney, Agent, or Firm* — Brooks Kushman P.C.

(57) ABSTRACT

A packaging machine that may include a protective cover and a token fastening capsule arranged on the protective cover. The protective cover may include a receptacle that is configured for receiving a token. The receptacle may have a first contact surface. The fastening capsule may include a cap for covering an opening of the receptacle and that includes a second contact surface. The first contact surface and the second contact surface may be in contact with each other when the cap covers the opening of the receptacle. In one embodiment, the receptacle and/or the cap is provided with a knurl, the knurl being provided on the first or the second contact surface. Further, a method of fastening a token on a protective cover is presented wherein the receptacle may be cold welded to the cap in view of the structure provided above.

16 Claims, 5 Drawing Sheets

(51) Int. Cl.
*F16P 1/02* (2006.01)
*B65B 59/04* (2006.01)
*B65B 57/00* (2006.01)

(58) Field of Classification Search
USPC .................................. 53/453, 77, 559, 393
See application file for complete search history.

(56) References Cited

U.S. PATENT DOCUMENTS

| | | | | |
|---|---|---|---|---|
| 4,168,598 A | * | 9/1979 | Omori | B65B 9/04 53/433 |
| 2005/0016134 A1 | * | 1/2005 | Prebelli et al. | B65B 57/08 53/559 |
| 2007/0157431 A1 | * | 7/2007 | Bertani | F16P 3/08 16/262 |
| 2012/0291399 A1 | * | 11/2012 | Bonneville et al. | B65B 9/04 53/203 |
| 2014/0290180 A1 | | 10/2014 | Olbrich et al. | |

FOREIGN PATENT DOCUMENTS

| | | | | |
|---|---|---|---|---|
| DE | 102010034472 A1 | * | 2/2012 | ............... F16P 3/08 |
| EP | 2489818 A1 | | 8/2012 | |
| EP | 2749499 A1 | | 7/2014 | |
| JP | 2004071195 A | * | 3/2004 | ............... F16P 3/08 |

\* cited by examiner

PACKAGING MACHINE WITH A PROTECTIVE COVER, A TOKEN FASTENING CAPSULE ARRANGED THEREON AS WELL AS A METHOD

CROSS-REFERENCE TO RELATED APPLICATIONS

This Application claims priority to German Patent Application No. 10 2017 126 615.1 filed on Nov. 13, 2018 to Hubert Schaub, Manuel Wölfle, Nadine Reichart and Alexander Wanner, currently pending, the entire disclosure of which is incorporated herein by reference.

FIELD OF THE INVENTION

The present invention relates to a packaging machine packaging having a protective cover and a token fastening capsule arranged on the protective cover and a method for fastening a token on a protective cover of the packaging machine.

BACKGROUND OF THE INVENTION

For facilitating safe production, protective covers have hitherto been used on a packaging machine, in particular on a thermoform packaging machine or on a tray sealer, along a production line, e.g. upstream and downstream of a forming and/or sealing station. These protective covers can prevent operators from reaching into the production flow. Up to now, solutions are known, in the case of which the protective covers loosely rest on an upper side of the machine frame. For gaining access to the packaging machine, e.g. for the purpose of cleaning and/or maintenance, the protective covers are simply removed.

In addition, solutions are known according to which it is checked whether the protective covers are present and/or whether they are properly in place. In cases where it is detected that the protective covers are not present or not properly in place, the packaging machine can be prevented from operating so as to avoid injuries. For this purpose, identification features, which can be detected by sensors of the packaging machine, are provided on the surfaces of the protective covers with which the latter rest on the packaging machine. These identification features may be magnets, by way of example.

The conventional way of attaching such magnets using plastic capsules has a plurality of drawbacks that make them unsuitable in particular for cases of use where high hygiene requirements have to be satisfied, such as in the field of food production or medical applications. In such cases of use, the plastic capsules are often exposed to aggressive cleaning agents and/or demanding environmental conditions, e.g. high temperatures and/or humidity, possibly at high pressure. Inexpensive plastics of the type that have to be used for such small parts do not resist this kind of conditions and/or age faster than under less rough conditions. Furthermore, existing fastening capsules are difficult to seal, and this makes cleaning even more difficult.

In particular in the aged condition, there is also the risk that the embrittled plastic materials will break even due to minor shocks and will then detach themselves from the protective covers. Hence, the conventional fastenings have to be replaced frequently. Even more serious, however, is the risk that the products packed by the packaging machine will be contaminated by fragments, and this may result in expensive product recalls and even in claims for damages in the medical sector.

SUMMARY OF THE INVENTION

It is the object of the present invention to provide a packaging machine with an improved mode of fastening identification features to protective covers. In addition, it is also an object to provide an improved method of fastening an identification feature to a protective cover of a packaging machine. Advantageous further developments are disclosed in the respective dependent claims.

The packaging machine according to the present invention may comprise a protective cover and a token fastening capsule arranged on the protective cover. The fastening capsule may include a receptacle, which is configured for receiving a token and which has a first contact surface. The fastening capsule may further include a cap configured for covering an opening of the receptacle and having a second contact surface. The first contact surface and the second contact surface may be in contact with each other, when the cap covers the opening of the receptacle. The invention is characterized in that the receptacle or the cap may be provided with a knurl, the knurl being provided on the first or the second contact surface. This has the advantage that the protrusions and the depressions of the knurl may penetrate into the material of the respective counterpart. In this way, a connection that can only be released through destruction can be established. Safety requirements can thus be met more easily.

Protective covers are to be understood as e.g. components that are provided on the packaging machine and/or on a machine frame thereof and which cover areas of the packaging machine from above and/or the side, e.g. protective hoods or side covers. In addition, insert templates, facilitating the filling of the packages produced, may be regarded as protective covers in the sense of the present invention.

Tokens in the sense of the present invention may be objects, which enable or facilitate recognition, sensing or detection of the token in question by a respective detection unit, in particular by a sensor. As has already been indicated, a simple magnet may be used as such a token. A machine-readable, in particular a wireless-readable data carrier, e.g. an RFID device, may also be conceivable.

It is conceivable that the knurl may comprise grooves. The latter may extend e.g. straight or in a curved shape. It will be particularly advantageous, if the grooves extend parallel to or at an angle to an attaching direction, in which the cap can be attached to the receptacle. Grooves extending parallel to the attaching direction may be advantageous insofar as the cap can be attached more easily. Grooves extending at an angle to the attaching direction may be advantageous insofar as the fastening effect may be higher.

It will be particularly advantageous when a seal may be arranged between the cap and the receptacle. In this way, gaps and cracks between the components can be sealed even better, thus improving hygiene. The seal may be produced e.g. from an elastomeric material, in particular a silicone material.

According to a particularly advantageous embodiment, the cap and/or the receptacle are produced from a metallic material, preferably stainless steel or aluminum, preferably anodized aluminum. Such materials are particularly suitable for the press-fitted connections provided according to the present invention. These materials may be e.g. be press-fitted, in particular cold welded, which is a particularly robust type of connection. They are also less susceptible to embrittlement caused by the cleaning agents, some of which are aggressive. For this reason but also in general the above-mentioned materials are substantially less prone to sliver, so that contamination of the products or packages to be produced is less likely. At least, any fragments of such metallic materials could be detected by metal detectors. In addition, shocks that would already result in breaking of other fastening materials may, in the case of metallic materials, in particular stainless steel materials, only cause a deformation that does not impair the function. The frequency of replacement may be reduced in this way.

The present invention also relates to a method of fastening a token on a protective cover of a packaging machine, that may comprise one or more of the following steps: providing an opening in the protective cover, the opening extending through the protective cover from a first side of the protective cover to a second side of the protective cover, the second side being opposed to the first side, passing a receptacle, which receives the token therein, through the opening from the first side, and covering the receptacle by a cap from the second side.

The method may be characterized by press-fitting the receptacle to the cap. As has already been mentioned hereinbefore, press-fitted components can be a particularly robust type of connection. During such press-fitting, the components may e.g. be cold welded.

The method may advantageously comprise the step of arranging a first seal between the receptacle and the first side of the protective cover. The sealing of gaps and cracks can thus be improved further. It is particularly advantageous, when the first seal is arranged prior to passing the receptacle through the opening.

According to a further imaginable variant, the method additionally comprises arranging a second seal between the cap and the second side of the protective cover. Further gaps where dirt residues or other deposits can collect or remain can be prevented in this way. It will be particularly advantageous, when the second seal is arranged prior to covering the receptacle by the cap. This sequence will, in turn, simplify the fastening procedure.

Other aspects and advantages of the present invention will be apparent from the following detailed description of the preferred embodiments and the accompanying drawing figures.

DESCRIPTION OF THE SEVERAL VIEWS OF THE DRAWINGS

In the following, an advantageous embodiment of the present invention will be explained in more detail making reference to a drawing, in which the individual figures show.

DETAILED DESCRIPTION OF THE INVENTION

Figure 1:
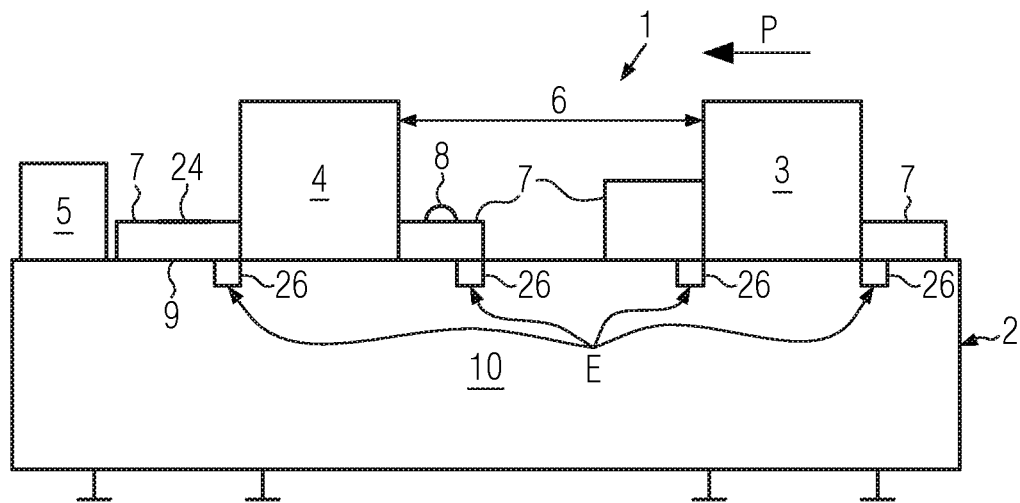
FIG. 1 is a schematic illustration of one embodiment of a packaging machine in accordance with the teachings of the present invention having protective covers positioned thereon.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1 shows schematically a side view of an operating side of a packaging machine 1 according to the present invention, which is configured as a thermoform packaging machine in the present embodiment. The packaging machine 1 may comprise a machine frame 2, a forming station 3, a sealing station 4 and a cutting station 5. The forming station 3 can form troughs in a bottom film/foil, which is not shown in detail. The troughs of the bottom film may be filled with products along a filling line 6. At the sealing station 4 a cover film, which is not shown in detail, can be sealed onto the bottom film. This can be done after the trough interior has been evacuated and/or flushed with gas, e.g. for increasing the shelf life of foodstuffs. The packages formed in the combined bottom and cover films may be separated from one another at the cutting station 5 and conveyed out of the packaging machine 1 mechanically or removed therefrom manually.

Certain areas directly upstream or downstream of the forming station 3, the sealing station 4 and/or the cutting station 5 must be protected against an operator reaching in from above during operation, so as to prevent e.g. injuries if he puts his hand into a lifting mechanism. For this purpose, protective covers 7 may be provided on any sections of the packaging machine 1 where they are necessary or helpful, in particular, as shown in FIG. 1, upstream and/or downstream of the forming station 3 and/or upstream and/or downstream of the sealing station 4.

For maintenance, retrofitting or cleaning purposes, the protective covers 7, which are loosely placed on the machine frame 2, can be removed from their position. Especially for hygienic reasons, it is, however, undesirable to place the protective covers 7 on the floor next to the packaging machine 1. In particular when the packaging machine 1 is cleaned every day, as will usually be the case, the protective covers 7 will have to be removed from their position so as to make the area therebelow accessible for cleaning. Also the protective covers 7 themselves should be positioned conveniently for cleaning.

Depending on the zone to be protected, the protective covers 7 according to FIG. 1 may have different sizes. However, when seen in the production direction P, the respective protective covers 7 are equal in width. FIG. 1, however, indicates that the respective protective covers 7 may differ in depth and/or height, when seen in the production direction P. Also the use of protective covers 7 having identical dimensions may be considered.

The protective cover 7 exemplarily positioned upstream of the sealing station 4 in FIG. 1 is provided with a handle 8, which facilitates lifting of the protective cover 7 by the operator. The handle 8 may also be provided on the other protective covers 7 of FIG. 1.

FIG. 1 also shows that the respective protective covers 7 are placed onto an upper side 9 of a side frame 10 of the packaging machine 1. The side frame 10 defines part of the machine frame 2 of the packaging machine 1. According to FIG. 1, the protective cover 7 placed downstream of the sealing station 4, when seen in the production direction P, has a window 24.

Figure 2:
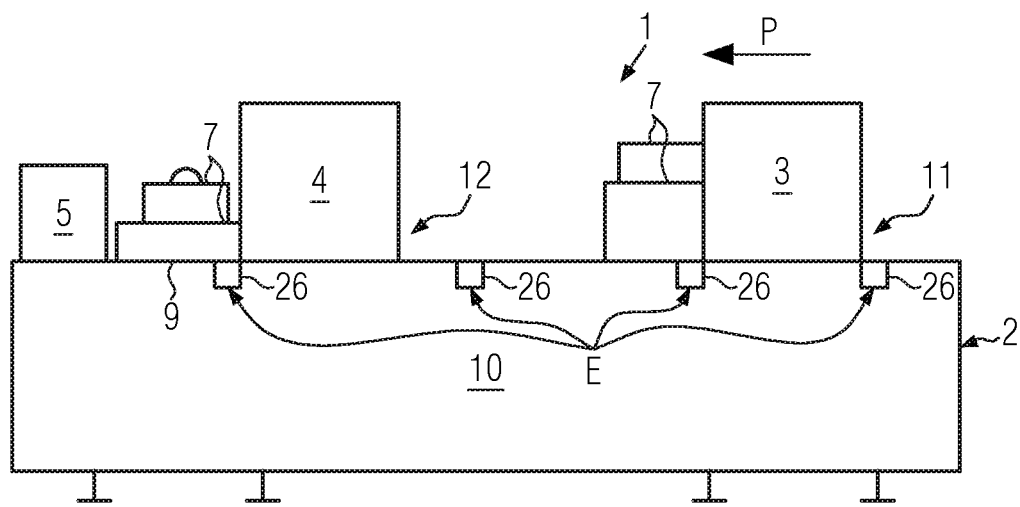
FIG. 2 is a schematic illustration of an embodiment of a packaging machine in accordance with the teachings of the present invention during a production break.

FIG. 2 shows in a schematic side view the packaging machine 1 during a production break. According to FIG. 2, two protective covers 7 each are stacked one on top of the other on the upper side 9 of the side frame 10 of the packaging machine 1, so as to open up a feed area 11 up stream of the forming station 3 and another feed area 12 upstream of the sealing station 4, when seen in the production direction P. Hence, the respective feed areas 11, 12 can be accessed, and cleaning and/or maintenance work can thus be carried out in these zones. In spite of the exemplary illustration according to FIG. 2, it would, of course, also be possible to position the respective stacked protective covers 7 upstream of the forming station 3 and/or the sealing station 4, when seen in the production direction P, so as to open up respective output areas downstream of the forming station 3 and/or the sealing station 4. In addition, it would be imaginable to form only one stacked tower on the upper side 9 of the packaging machine 1, so as to open up the largest possible number.

The presence of the protective covers 7 can be checked, in particular using a detection unit E formed on the packaging machine 1. This detection unit E may comprise e.g. sensors 26. In case it is detected that one or a plurality of protective covers 7 are missing or occupy an improper, e.g. tilted, position on the packaging machine 1, the machine can be prevented from starting.

Figure 3:
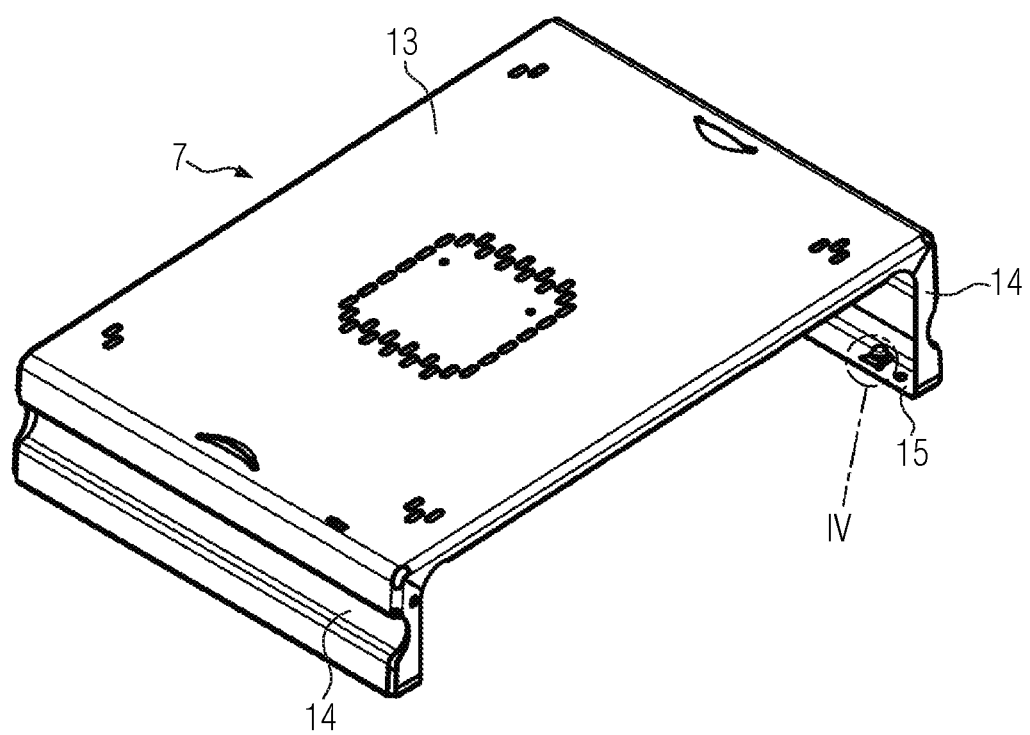
FIG. 3 is a perspective view of one embodiment of a protective cover of the packaging machine in accordance with the teachings of the present invention.

FIG. 3 shows a perspective view of one of the protective covers 7. This protective cover 7 may, as in the case of the present embodiment, have a lid 13. In addition, two side walls 14 may be provided, which provide for a spacing of the lid 13 from the package to be produced and/or from the machine frame 2. However, this may also be ensured by other devices, e.g. by an arcuate structural design of the lid 13. Furthermore, the protective cover 7 may comprise a section 15 for mounting a token 16, in the present embodiment a magnet 16. This section 15 may be a flange 15 arranged on the side of the side wall 14 that faces away from the lid 13. This flange 15 may also serve to enlarge the contact area of the protective cover 7. The flange 15 may have a magnet 16 (cf. FIG. 5) attached thereto. To this end, a token fastening capsule 17, in the present embodiment a magnet fastening capsule 17 (cf. FIG. 4), may be used.

Figure 4:
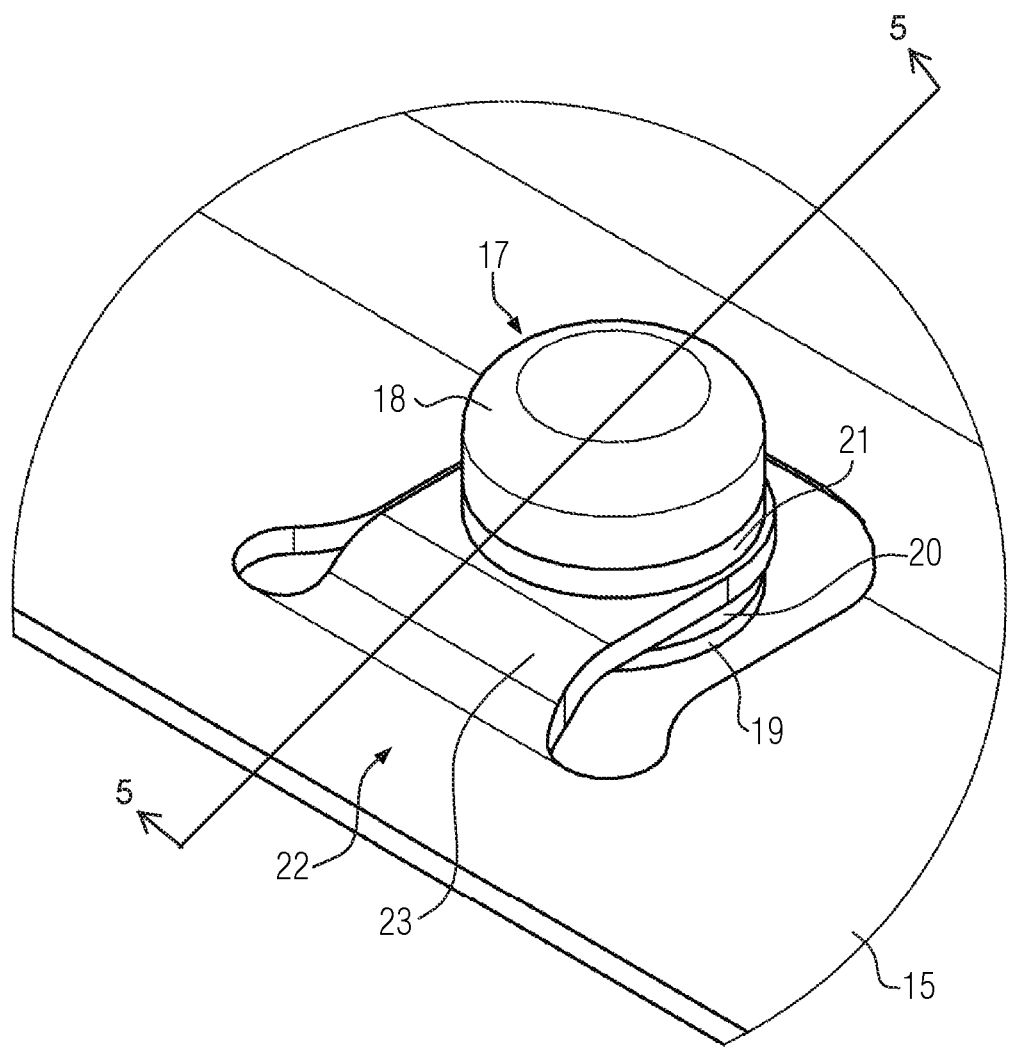
FIG. 4 is an enlarged perspective detail view of the area identified as IV in FIG. 3.

FIG. 4 shows an enlarged view of the area identified by IV in FIG. 3. In this way, it can be seen that the magnet fastening capsule 17 has a cap 18. In addition, a part of a receptacle 19 of the magnet fastening capsule 17 can be seen. As shown in the present embodiment, the magnet fastening capsule 17 may also have a first seal 20 and a second seal 21. However, configurations comprising only one, or more than two seals are imaginable as well. The section 15 to which the magnet is intended to be fastened, i.e. in the present embodiment the flange 15, may have provided thereon a fastener 22. The latter may be e.g. a flap 23, which is preferably bent and/or elevated in relation to the section 15.

Figure 5:
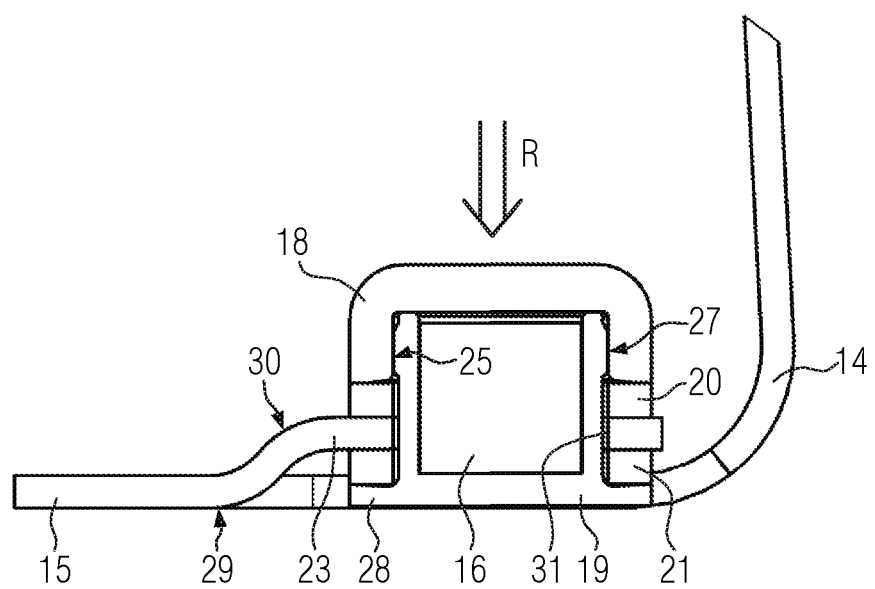
FIG. 5 is a sectional side view of the token fastening capsule of FIG. 4 cut along the line 5-5.

Further details of the magnet fastening capsule 17 can be seen from the sectional view shown in FIG. 5. It can be seen that the first contact surface 25 of the receptacle 19 is in contact with the second contact surface 27 of the cap 18.

The receptacle 19 may have a stop section 28. The latter may, as in the case of the present embodiment, assume the shape of a flange. The stop section 28 and the first seal 20 may be arranged on a first side 29 of the protective cover 7. The cap 18 and the second seal 21 may be arranged on a second side 30 of the protective cover 7. Those skilled in the art will recognize that, in a configuration without the first and second seals 20, 21, the cap 18 can be arranged on the first side 29 of the protective cover 7 and the stop section 28 of the receptacle 19 can be arranged on the second side 30 of the protective cover 7. From the drawing it can be seen that the elevation of the flap 23 in relation to the remainder of the section 15 for magnet mounting may be adapted to a thickness of the stop section 28 or to a sum of the thicknesses of the stop section 28 and of the first seal 20. Adapted means in this context that the elevation is chosen to be at least equal to or larger than the thickness to be compared.

In addition, it can be seen in FIG. 5 that, in the mounted condition, the receptacle 19 may extend through an opening 31 that may be provided in the protective cover 7, in particular in the section 15 used for mounting the magnet 16. For mounting the magnet 16 on the protective cover 7, the receptacle 19 can be passed through the opening 31 from the first side 29 according to the present invention. Subsequently, the cap 18 can be attached to the receptacle 19 from the second side 30. This can be done in an attaching direction R. The cap 18 and the receptacle 19 can be configured in such a way that they will be cold welded to each other during mounting.

In configurations comprising additionally one or both of the two seals 20, 21, the first seal 20 may be arranged between the receptacle 19, preferably the stop section 28, and the first side 29 of the protective cover. This can be done before the receptacle 19 is passed through the opening 31 or afterwards, e.g. by pulling the first seal 20 over the stop section 28. Alternatively or additionally, the second seal 21 may be arranged between the cap 18 and the second side 30 of the protective cover 7. This can be done before the receptacle 19 is covered by the cap 18 or afterwards, e.g. by pulling the second seal 21 over the cap 18. The second seal may especially be arranged after the receptacle 19 has been passed through the opening 31.

The person skilled in the art will be able to see from FIG. 5 that at least part of the stop section 28 of the receptacle 19 may have larger dimensions, in particular a larger diameter, than the opening 31. The same applies to the dimensions of the cap 18. A section 32 of the receptacle 19 passed through the opening 31 may, in contrast, have smaller dimensions, in particular a smaller diameter, than the opening 31.

The cap 18 and the receptacle 19 may, preferably taking into consideration the seals 20, 21, in particular be configured such that, when the cap 18 has been attached to the receptacle 19, the section 15 of the protective cover 7 is clamped in position between the receptacle 19, in particular the stop section 28, and the cap 18, or between the first and second seals 20, 21. This guarantees a particularly reliable kind of fastening.

Figure 6:
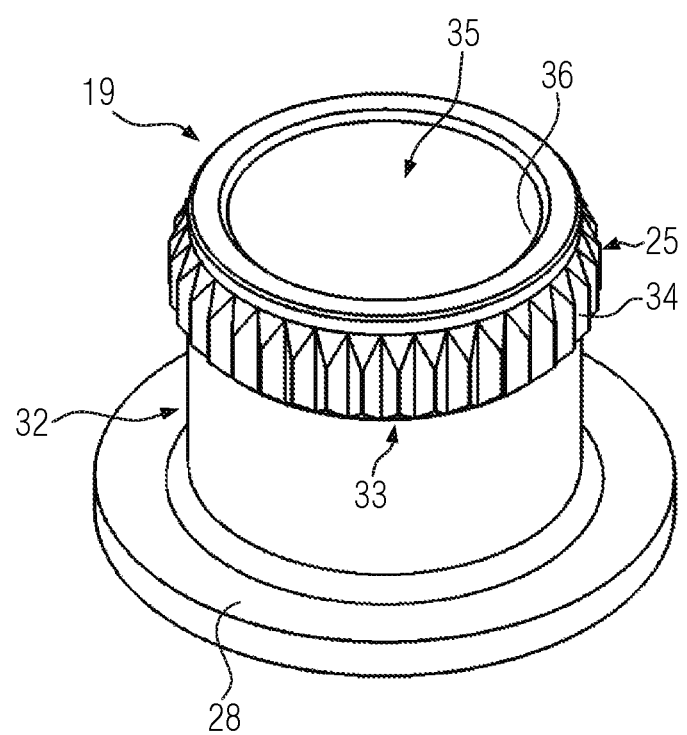
FIG. 6 is a perspective view of one embodiment of a receptacle of a token fastening capsule in accordance with the teachings of the present invention.

Further details of the receptacle 19 can be seen from the perspective view according to FIG. 6. For example, it can now be seen that the first contact surface 25 is provided with a knurl 33. A knurl 33 in the sense of the present invention is to be regarded as comprising e.g. a plurality of raised portions and/or depressions. As can be seen in the present embodiment, the knurl 33 may comprise a plurality of grooves 34. The latter can be produced by forming depressions in the receptacle and/or by providing raised portions. Although this is not shown in the present embodiment, a person skilled in the art will be aware that a knurl 33 may also be provided on the contact surface 27 of the cap 18. In both cases, the grooves 34 may, as in the case of the present embodiment, extend parallel to the attaching direction R. In addition, an opening 35 can be seen, which allows access to a depression 36 in which the magnet 16 can be accommodated.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention.

As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A packaging machine comprising:
   a protective cover and a token fastening capsule arranged on the protective cover, wherein the fastening capsule includes a receptacle configured for receiving a token and having a first contact surface;
   the fastening capsule further including a cap configured for covering an opening of the receptacle and having a second contact surface;
   wherein, the first contact surface and the second contact surface are in contact with each other when the cap covers the opening of the receptacle; and
   wherein the receptacle or the cap is provided with a knurl, the knurl being provided on one of the first or the second contact surface.

2. The packaging machine according to claim 1, wherein the knurl comprises grooves.

3. The packaging machine according to claim 2, wherein the grooves extend parallel to or at an angle to an attaching direction, and the cap can be attached to the receptacle in the grooves.

4. The packaging machine according to claim 1, further comprising a seal arranged between the cap and the receptacle.

5. The packaging machine according to claim 4, wherein the seal is produced from an elastomeric material.

6. The packaging machine according to claim 5, wherein the seal is produced from a silicone material.

7. The packaging machine according to claim 1, wherein the cap and/or the receptacle are/is produced from stainless steel.

8. The packaging machine according to claim 1, wherein the cap and/or the receptacle are/is produced from aluminum.

9. The packaging machine according to claim 8, wherein the aluminum comprises anodized aluminum.

10. A method of fastening a token on a protective cover of a packaging machine, the method comprising the steps of:
    providing an opening in the protective cover, wherein the opening extends through the protective cover from a first side of the protective cover to a second side of the protective cover, and wherein the second side is opposite the first side;
    passing a receptacle through the opening from the first side;
    receiving a token in the receptacle;
    covering the receptacle by a cap from the second side; and
    press-fitting the receptacle to the cap.

11. The method according to claim 10, further comprising the step of arranging a first seal between the receptacle and the first side of the protective cover.

12. The method according to claim 11, wherein the arranging the first seal step occurs prior to passing the receptacle through the opening step.

13. The method according to claim 12, further comprising the step of arranging a second seal between the cap and the second side of the protective cover.

14. The method according to claim 13, wherein the arranging the second seal step occurs prior to covering the receptacle by the cap step.

15. The method according to claim 10, further comprising the step of arranging a second seal between the cap and the second side of the protective cover.

16. The method according to claim 15, wherein the arranging the second seal step occurs prior to covering the receptacle by the cap step.

* * * * *